US006662205B1

(12) United States Patent
Bereiter

(10) Patent No.: US 6,662,205 B1
(45) Date of Patent: Dec. 9, 2003

(54) SCALEABLE AND EXTENSIBLE SYSTEM MANAGEMENT ARCHITECTURE WITH DATALESS ENDPOINTS

(75) Inventor: Thomas W. Bereiter, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/724,663

(22) Filed: Oct. 1, 1996

(51) Int. Cl.[7] .............................................. G06F 15/16

(52) U.S. Cl. ........................ 709/201; 709/219; 709/223

(58) Field of Search ................................ 395/825, 180, 395/200.11, 575, 51, 161; 370/17, 397; 380/24; 709/201, 104, 227, 200, 226, 223, 220, 203, 224, 229, 238; 714/45; 707/103, 2, 10; 713/324; 705/39, 34; 703/26; 345/716; 436/43

(56) References Cited

U.S. PATENT DOCUMENTS

| | | | |
|---|---|---|---|
| 4,897,781 A | 1/1990 | Chang et al. | 707/201 |
| 5,151,989 A | 9/1992 | Johnson et al. | 707/10 |
| 5,235,642 A | 8/1993 | Wobber et al. | 380/25 |

(List continued on next page.)

FOREIGN PATENT DOCUMENTS

| | | |
|---|---|---|
| EP | 0718781 | 12/1995 |
| EP | 0178761 A1 | 6/1996 |
| WO | WO 89/03086 A1 | 4/1989 |
| WO | 8903086 | 4/1989 |

OTHER PUBLICATIONS

Dave, A. et al, "Proxies, Application Interfaces, and Distributed Systems," Proceedings International Workshop on Object Orientation in Operating Systems, Jan. 1, 1992, pp. 212–220, XP00204311.

Schmidt, D., "A domain analysis of network daemon design dimensions," C++ Report, vol. 6, No. 3, Mar. 1, 1994, pp. 50–59, 65, XP000577570.

Corba Facilities,www.omg.org. Common Facilities Architecture, Nov. 1995.*

Corba Facilities,www.omg.org. Common Facilities Architecture, Nov. 1995.*

Chang, Johnson, Morgan, and Smith, IBM Technical Disclosure—Maintaining Data Consistency In A Distributed Data Processing System, Dec. 1991.

*Primary Examiner*—Mark R. Powell
*Assistant Examiner*—Thong Vu
(74) *Attorney, Agent, or Firm*—Jeffrey S. LaBaw; Joseph R. Burwell

(57) ABSTRACT

A large distributed enterprise includes computing resources that are organized into one or more managed regions, each region being managed by a server machine servicing one or more gateway machines, with each gateway machine servicing a plurality of endpoint machines. A distributed system management framework is supported on the gateway machines and the one or more endpoint machines to carry out system management tasks. To enhance scalability, the endpoint machines support a low cost, low maintenance client component of the system management framework, and a corresponding server component is supported on each of the gateway machines. On an as-needed basis, appropriate executable code and system management data is delivered from a gateway to one or more endpoint machines to facilitate execution of a system management task for the managed region. Typically, the system management data is not stored in the endpoint, and this "dataless" approach reduces the complexity and maintenance costs associated with distributing the functionality of the system management framework. The endpoints are easily extensible to include new application functionality without requiring the overall framework to be rebuilt or reinstalled.

18 Claims, 5 Drawing Sheets

U.S. PATENT DOCUMENTS 5,299,207 A * 3/1994 Fujii .......................... 714/45
5,321,815 A 6/1994 Bartolanzo, Jr. et al. .................... 395/200.71
5,339,392 A * 8/1994 Risberg et al. ............ 395/161
5,341,496 A * 8/1994 Middledorp et al. ........ 395/575
5,347,632 A * 9/1994 Filepp et al. .............. 709/200
5,452,447 A 9/1995 Nelson et al. ............. 707/205
5,457,680 A * 10/1995 Kamm et al. ................ 370/17
5,491,820 A * 2/1996 Belove et al. ................ 707/3
5,511,208 A 4/1996 Boyles et al. .......... 395/200.53
5,535,116 A 7/1996 Gupta et al. ............... 364/134
5,557,747 A * 9/1996 Rogers et al. ......... 395/200.11
5,598,566 A * 1/1997 Pascucci et al. ........... 713/324
5,613,155 A * 3/1997 Baldiga et al. ............ 395/825
5,630,757 A * 5/1997 Gagin et al. ................. 436/43
5,640,541 A * 6/1997 Bartram et al. .............. 703/26
5,699,500 A * 12/1997 Dasgupta ................... 395/180
5,734,589 A * 3/1998 Kostreski et al. .......... 345/716
5,751,914 A * 5/1998 Coley et al. ................. 395/51
5,758,083 A * 5/1998 Singh et al. ............... 709/223
5,768,505 A * 6/1998 Gilchrist ............. 709/201.104
5,771,354 A * 6/1998 Crawford ................... 709/229
5,774,660 A * 6/1998 Brendel et al. ....... 709/201.104
5,812,668 A * 9/1998 Weber ........................ 380/24
5,818,842 A * 10/1998 Burwell et al. ............ 370/397
5,826,019 A * 10/1998 Ronstrom .................. 709/203
5,870,753 A * 2/1999 Chang et al. .............. 707/103
5,875,306 A * 2/1999 Bereiter ..................... 709/220
5,893,077 A * 4/1999 Griffin ........................ 705/34
5,960,176 A * 9/1999 Kuroki et al. ............. 709/224
5,996,012 A * 11/1999 Jarriel ....................... 709/226
6,041,166 A * 3/2000 Hart et al. ................. 709/238
6,047,323 A * 4/2000 Krause ...................... 709/227
6,070,001 A * 5/2000 Meissner et al. .......... 709/201
6,101,549 A * 8/2000 Baugher et al. ........... 709/238

* cited by examiner

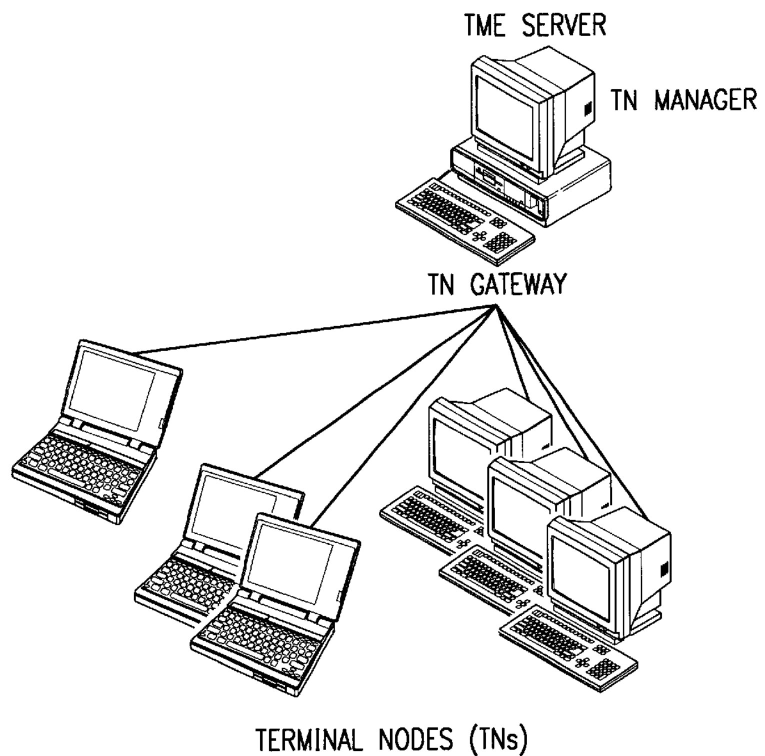
FIG. 3
FIG. 6
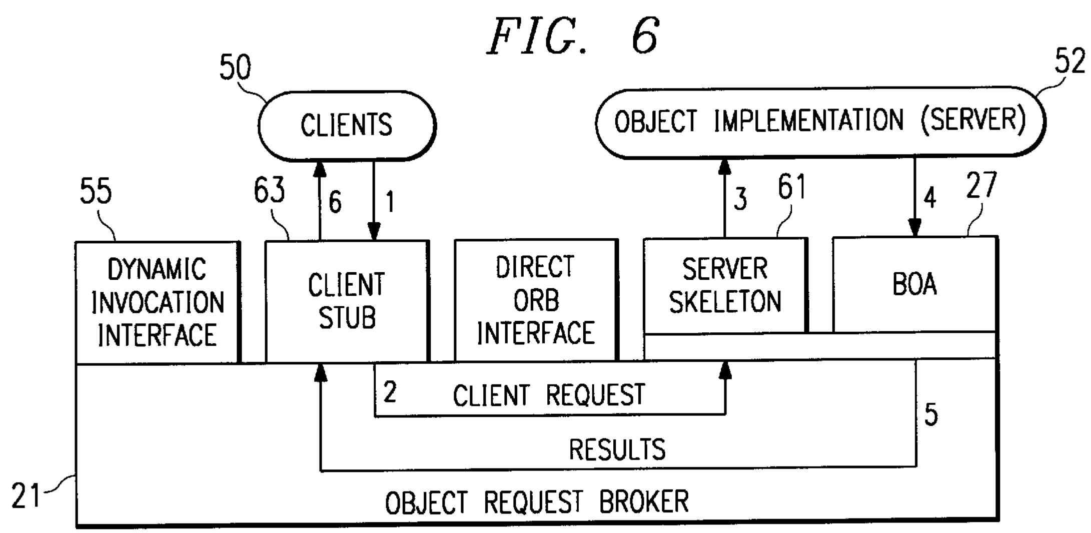

SCALEABLE AND EXTENSIBLE SYSTEM MANAGEMENT ARCHITECTURE WITH DATALESS ENDPOINTS

TECHNICAL FIELD

The present invention is directed to managing a large distributed computer enterprise environment.

BACKGROUND OF THE INVENTION

Managing a computer network comprising thousands of nodes can produce serious difficulties for system administrators. Management tasks, such as distribution of system-wide changes, must be carried out quickly and in a dependable manner in order to reduce the probability of catastrophic failure. Distributed computing environments that are known in the art do not scale easily to large size. One of the root causes of this deficiency is that prior art management environments include high overhead applications that, typically, are run on all of the managed machines in the network. In such systems, even machines located at the lowest level of management functionality (so-called "endpoints") often include a full suite of management routines and systems management data. Because the endpoint machine has its own database, it has to be backed-up to accurately back up the overall environment.

As the number of such machines gets large, the time to backup all the distributed databases becomes great and the backup storage requirements become unmanageable. When endpoint machines fail, or when users accidentally remove files, it is an enormous burden on system administrators to have to locate and restore the endpoint's database, especially if the missing database prevents the overall managed architecture from being able to distribute to the failed endpoint. Moreover, adding new application functionality to an endpoint machine typically requires the overall management architecture to be re-built, re-installed or, at least, re-initialized. This is a time-consuming, complex administrative task that severely limits the flexibility and increases the cost of system management. As a result of these problems, it has not been possible to increase the size or "scalability" of such networks to a true "enterprise" level.

The present invention addresses and solves these problems.

BRIEF SUMMARY OF THE INVENTION

It is a primary object of the invention to effectively manage computing resources in a large distributed enterprise environment.

It is another object of the invention to enable an enterprise to place substantially all of its computing resources on a network that is managed in a reliable, cost-effective manner.

It is still another object to reduce the complexity and cost of systems management in a large enterprise environment by supporting a low cost, low maintenance management framework on the vast majority of machines (e.g., the personal computers or PC's) in the enterprise.

Yet another object is to enhance the scalability of a large distributed computing network by distributing the functionality of a system management framework in accordance with a "client-server" paradigm.

A more specific object of the invention is to implement a low cost, low maintenance component of a system management framework at the endpoint machines that comprise the largest percentage of computing resources in the enterprise environment.

It is another more particular object to support a minimal set of applications on "dataless" endpoint machines of a large, distributed environment to facilitate systems management.

It is still another object of the invention to meet the needs of customers with very large and geographically-dispersed networks and, more particularly, to significantly expand the scalability parameters of traditional management tools and techniques.

Yet another important object is to enable PC connectivity in a large centrally-managed network enterprise.

These and other objects are achieved in a large distributed enterprise that includes computing resources organized into one or more managed regions, each region being managed by a server machine servicing one or more gateway machines, with each gateway machine servicing a plurality of endpoint machines. A system management framework is "distributed" on the gateway machines and the one or more endpoint machines to carry out system management tasks. To enhance scaleability, the endpoint machines support a low cost, low maintenance client component of the system management framework, and a corresponding server component is supported on each of the gateway machines. On an as-needed basis, system management data (and executable code, if necessary) is delivered from a gateway to one or more endpoint machines to facilitate execution of a system management task for the managed region. Typically, the system management data is not stored in the endpoint, and this "dataless" approach reduces the complexity and maintenance costs associated with distributing the functionality of the system management framework. The endpoints are easily "extensible" to include new application functionality without requiring the overall framework to be rebuilt or reinstalled.

A preferred method of executing a system management task affecting the managed region begins by delivering executable code and system management data required for the system management task from a gateway machine to one or more endpoint machines serviced by the gateway. The executable is a shell script, a specialized script, a compiled program or any other kind of valid executable. When a system management task is created, the executable is stored on disk, and a reference to the disk file is stored as an attribute in an object database in the gateway machine. Upon receipt of the executable code and system management data from the gateway machine, the client component of the management framework (supported on the endpoint machine) then carries out the management task. Preferably, data is not cached on the endpoint, and the endpoint returns to its normally "idle" state after the task is completed.

An endpoint computer connectable into such an enterprise thus includes a processor, an operating system, a graphical user interface, and a client component of a system management framework, the client component having an associated server component supported on a gateway machine that services that computer. The client component includes means responsive to receipt of executables and system management data from the gateway machine to facilitate execution of a system management task into which the computer is connected. Preferably, the system management framework is object-oriented.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 3 illustrates a smaller "workgroup" implementation (e.g., a local area network) of the enterprise in which the server and gateway functions are supported on the same machine;

FIG. 6 illustrates the ORB/BOA object-invocation mechanism used by the present invention;

DETAILED DESCRIPTION

Figure 1:
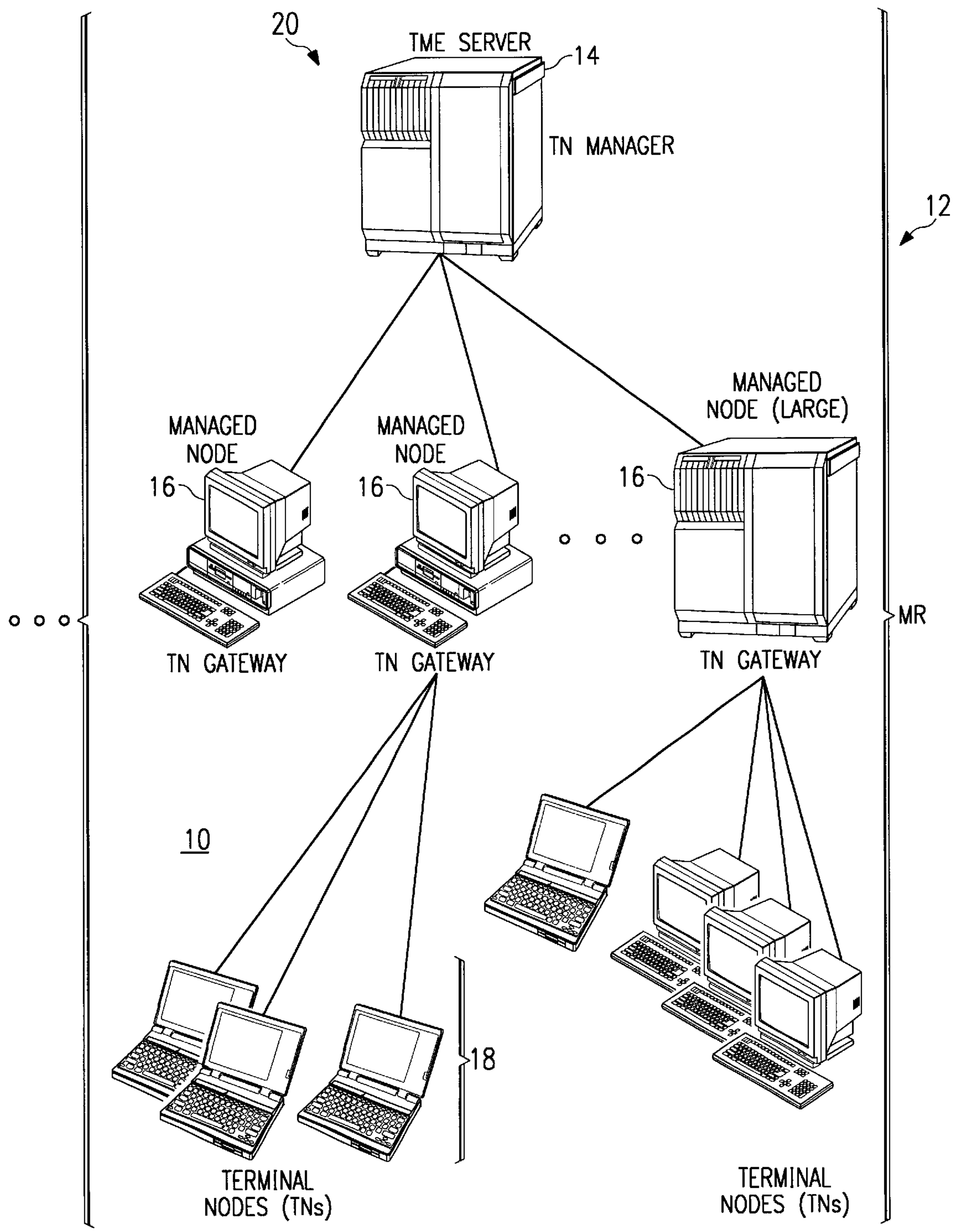
FIG. 1 illustrates a simplified diagram showing a large distributed computing enterprise environment in which the present invention is implemented.

Referring now to FIG. 1, the invention is preferably implemented in a large distributed computer environment 10 comprising up to thousands or even tens of thousands of "nodes." The nodes will typically be geographically dispersed and the overall environment is "managed" in a distributed manner. Preferably, the managed environment (ME) is logically broken down into a series of loosely-connected managed regions (MR) 12, each with its own server 14 for managing local resources with the MR. Multiple servers 14 coordinate activities across the enterprise and permit remote site management and operation. Each server 14 serves a number of gateway machines 16, each of which in turn support a plurality of endpoints 18. The server 14 coordinates all activity within the MR using a terminal node manager 20.

Figure 2:
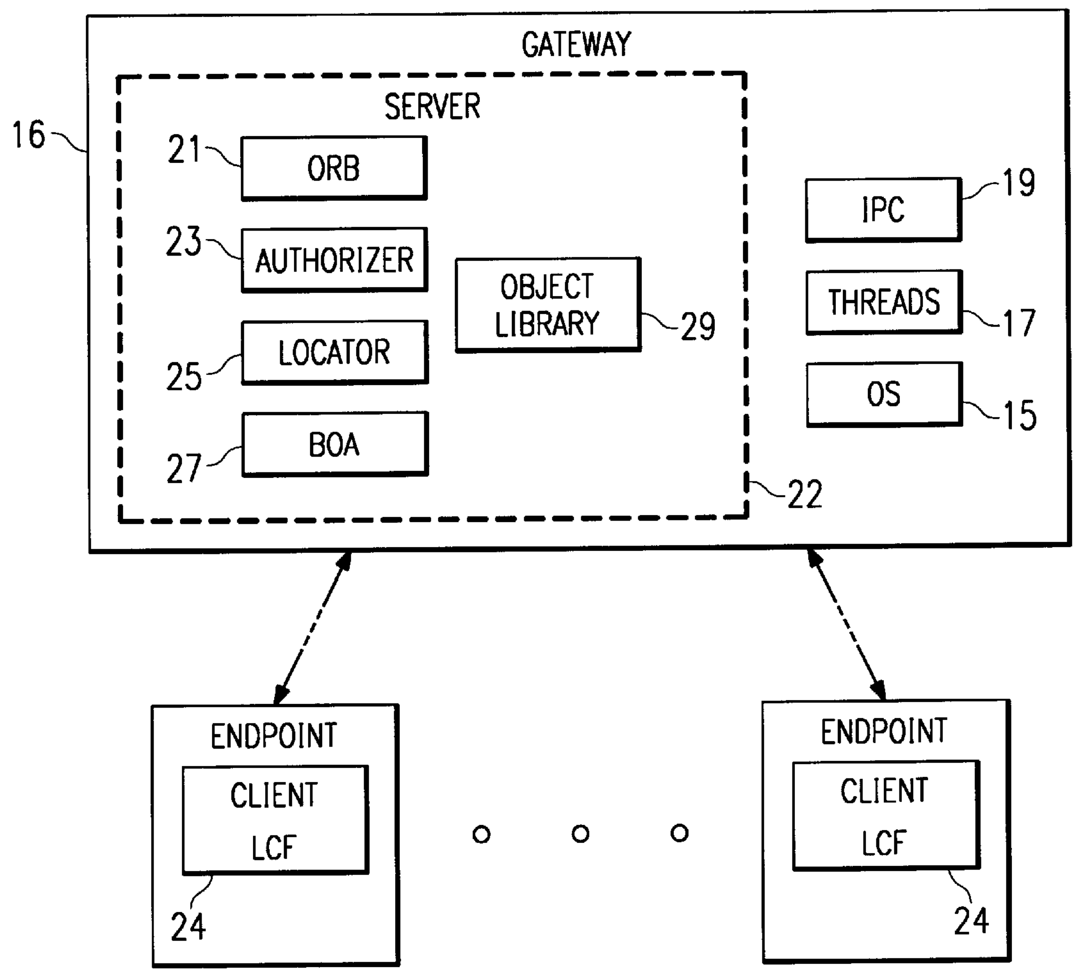
FIG. 2 is a block diagram of the system management framework illustrating how the framework functionality is distributed across the gateway and its endpoints within a managed region.

Referring now to FIG. 2, each gateway machine 16 runs a server component 22 of a system management framework. The server component 22 is multi-threaded runtime process that comprises several components: an object request broker or "ORB" 21, an authorization service 23, object location service 25 and basic object adaptor or "BOA" 27. Server component 22 also includes an object library 29. Preferably, the ORB 21 runs continuously, separate from the operating system, and it communicates with both server and client processes through separate stubs and skeletons via an interprocess communication (IPC) facility 19. In particular, a secure remote procedure call (RPC) is used to invoke operations on remote objects. Gateway machines 16 also includes an operating system 15 and a threads mechanism 17.

The system management framework includes a client component 24 supported on each of the endpoint machines 18. The client component 24 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. Using an object-oriented approach, the system management framework facilitates execution of system management tasks required to manage the resources in the MR. Such tasks are quite varied and include, without limitation, file and data distribution, network usage monitoring, user management, printer or other resource configuration management, and the like. System management tasks involve system management "data", which generally is the information collected or distributed as part of a particular system management task.

In the large enterprise such as illustrated in FIG. 1, there is one server per MR with some number of gateways. For a workgroup-size installation (e.g., a local area network or "LAN") such as illustrated in FIG. 3, a single server-class machine may be used as the server and gateway, and the client machines would run the lost cost framework. References herein to a distinct server and one or more gateway(s) should thus not be taken by way of limitation as these elements may be combined into a single platform. For intermediate size installations, the MR grows breadth-wise, with additional gateways then being used to balance the load of the endpoints.

The server is the top-level authority over all gateway and endpoints. The server maintains an endpoint list, which keeps track of every endpoint in a managed region. This list contains all information necessary to uniquely identify and manage endpoints including, without limitation, such information as name, location, and machine type. The server also maintains the mapping between endpoint and gateway, and this mapping is dynamic. Based on site-specific settings, it is possible to reassign endpoints when gateways go down or to automatically add new endpoints as they appear on the network.

As noted above, there are one or more gateways per managed region. A gateway is a full managed node that has been configured to operate as a gateway. Initially, a gateway "knows" nothing about endpoints. As endpoints login (discussed below), the gateway builds an endpoint list for its endpoints. The gateway's duties include: listening for endpoint login requests, listening for endpoint upcall requests, and (its main task) acting as a gateway for method invocations on endpoints.

Figure 2A:
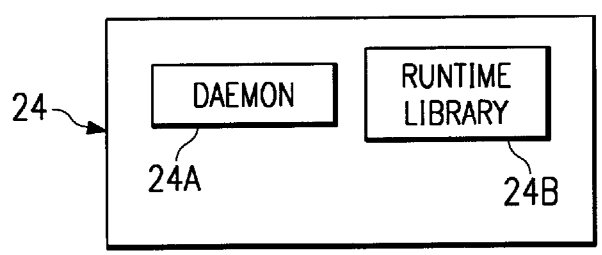
FIG. 2A is a block diagram of the elements that comprise the LCF client component of the system management framework.

As also discussed above, the endpoint is a machine running the system management framework client component, which is referred to herein as the low cost framework (LCF). The LCF has two main parts as illustrated in FIG. 2A: the lcf daemon 24*a* and an application runtime library 24*b*. The LCF daemon 24*a* is responsible for endpoint login and for spawning application endpoint executables. Once an executable is spawned, the LCF daemon 24*a* has no further interaction with it. Each executable is linked with the application runtime library 24*b,* which handles all further communication with the gateway.

Preferably, the server and each of the gateways is a computer or "machine.". For example, each computer may be a RISC System/6000® (a reduced instruction set or so-called RISC-based workstation) running the AIX (Advanced Interactive Executive) operating system, preferably Version 3.2.5 or greater. The AIX operating system is compatible at the application interface level with the UNIX operating system, version 5.2.

The various models of the RISC-based computers are described in many publications of the IBM Corporation, for example, *RISC System*/6000, 7073 *and* 7016 *POWERstation and POWERserver Hardware Technical Reference,* Order No. SA23-2644-00. The AIX operating system is described in *AIX Operating System Technical Reference,* published by IBM Corporation, First Edition (November, 1985), and other publications. A detailed description of the design of the UNIX operating system is found in a book by Maurice_J. Bach, *Design of the Unix Operating System,* published by Prentice-Hall (1986). Suitable alternative machines include: an IBM-compatible PC 486 or higher running Novell UnixWare 2.0, an AT&T 3000 series running AT&TUNIX SVR4 MP-RAS Release 2.02 or greater, Data General AViiON series running DG/UX version 5.4R3.00 or greater, an HP9000/700 and 800 series running HP/UX 9.00 through HP/UX 9.05. Motorola 88K series running SVR4 version R40V4.2, a Sun SPARC series running Solaris 2.3 or 2.4, or a Sun SPARC series running SunOS 4.1.2 or 4.1.3. Of course, other machines and/or operating systems may be used as well for the gateway and server machines.

Each endpoint is also a computer. In one preferred embodiment of the invention, most of the endpoints are personal computers (e.g., desktop machines or laptops). In this architecture, the endpoints need not be high powered or complex machines or workstations. One or more of the endpoints may be a notebook computer, e.g., the IBM ThinkPad® machine, or some other Intel x86 or Pentium®-based computer running Windows 3.1 or greater operating system. IBM® or IBM-compatible machines running under the OS/2® operating system may also be implemented as the endpoints. For more information on the OS/2 operating system, the reader is directed to *OS*/2 2.0 *Technical Library, Programming Guide Volumes* 1–3 *Version* 2.00, Order Nos. 10G6261, 10G6495 and 10G6494.

As noted above, the server-class framework running on each gateway machine is multi-threaded and is capable of maintaining hundreds of simultaneous network connections to remote machines. A thread of execution may be a separate process (in the UNIX paradigm) or a separate thread in a single process (in the POSIX pthreads paradigm). POSIX is a series of standards for applications and user interfaces to open systems, issued by the Institute of Electrical and Electronics Engineers Inc. (IEEE). The IEEE POSIX.1c is the emerging standard for user level multi-threaded programming and is implemented in the served component of the systems management framework. All objects in this framework exhibit "state." This state may be completely persistent, in which case it is represented by attributes in the object database associated with a gateway machine, or the state may be non-persistent. An example of the latter might be the current list of machines that are down.

In the preferred embodiment, the LCF is the smallest amount of code that can still do useful endpoint work. Generally, this means that the LCF code has the following characteristics: single-threaded, limited cascade and upcall capability, no persistent attributes and only a small set of CORBA runtime. Machines that see little management activity in a typical day are those for which the LCF is particularly advantageous. Machines that need to service a large volume of requests preferably run the server component of the system management framework.

The LCF is always ready to do management tasks, but consumes few resources because it is normally in an idle state. Preferably, each endpoint is "dataless" in the sense that system management data is not stored therein before or after a particular system management task is implemented or carried out. Therefore, unlike the prior art, there is no need to perform system backup or other conventional maintenance on the endpoint (at least with respect to the system management framework). Maintenance on the server and gateway machines suffices. Similarly, new application functionality may be added to the lcf without rebuilding, reinstalling or re-initializing the client component into the system management framework.

Since endpoints are dataless and readily extensible, the architecture is easily scaleable as illustrated in FIG. 1. The client component of the system management framework is inexpensive and requires little or no maintenance since much of the system management framework is off-loaded to the gateway machines that run the multi-threaded, server component. This architecture advantageously enables a rational partitioning of the enterprise with 10's of servers, 100's of gateway machines, and 1000's of endpoints. Each server typically serves up to 200 gateways, each of which services 1000's of endpoints. At the framework level, all operations to or from an endpoint pass through a gateway machine. In many operations, the gateway is transparent; it receives a request, determines the targets, resends the requests, waits for results, then returns results back to the caller. Each gateway handles multiple simultaneous requests, and there may be any number of gateways in an enterprise, with the exact number depending on many factors including the available resources and the number of endpoints that need to be serviced.

Thus, according to the present invention, one or more of the endpoints 18 are "dataless." Except for the LCF executable itself, preferably there is no database or other state that must be kept on the endpoint. Whenever executable code and/or system management data are needed for a particular system management task, such code and/or data are delivered from a particular gateway machine to the affected endpoints machines automatically. Typically, the executable code and/or data will remain valid for the particular task invocation; while the executable code may be cached, usually the system management data will not be. If the executable code is cached, preferably the system management framework may be configured to automatically resend such code without operator intervention if the cache is lost or periodically flushed.

An endpoint is added to the enterprise by first copying the LCF daemon 24*a* to the endpoint's disk. This may be done automatically through network login scripts, manually by inserting a diskette, or by preloading the boot disk at the time of purchase or license. The first time the LCF daemon is installed, and on each subsequent boot, the LCF daemon attempts to login to its gateway. If the gateway is not known or if the gateway does not respond, the daemon issues a broadcast requesting a gateway. For completely new endpoints the broadcast is ultimately forwarded to the server. If a gateway hears a broadcast or a login request from an endpoint it recognizes, the gateway services the request itself.

When the server receives an endpoint's gateway request broadcast, the server consults its endpoint list to see which gateway the endpoint belongs to. For new endpoints, or when migrating between gateways, the server uses a site specific policy to choose the correct gateway (e.g., by subnet). The gateway is informed of its new endpoint, the gateway informs the endpoint, and the login completes.

An endpoint preferably communicates only with its gateway. Requiring all endpoint communication to pass through a single gateway greatly simplifies connectivity issues. After a successful login, both endpoint and gateway know a working address by which to address one another. If a DHCP address lease expires, or anything changes in the network topology, then the next endpoint login will establish the new endpoint to gateway addresses.

There is no absolute maximum number of endpoints that can be supported by a single gateway. The design strategy is that the gateway is always in control of its own workload. The endpoints are not allowed to send data unless granted permission. When an endpoint has results to return, or if it wishes to make an upcall, it sends a very small message requesting service. The gateway queues the request and services the queue as time allows. When an endpoint has large results, it must break the results into chunks and may only send a chunk when instructed to do so. This strategy makes it possible for a single gateway to support thousands of endpoints, albeit somwhat slowly. If a better quality of service is desired, it is simply a matter of adding more gateways.

Endpoint methods are normal CORBA methods (as discussed below) linked with IDL compiler generated code and the endpoint application runtime library 24*b*. This results in a native executable designed to be spawned by the LCF daemon 24*a*. Any number of methods may be implemented in a single executable.

Preferably, an endpoint is installed without any methods. Method executables are downloaded from the gateway as required. When the LCF daemon receives a method invocation request, it checks the local disk cache. If there is a cache miss, or a version mismatch, then a new executable is downloaded. In this way, an endpoint can start with nothing and then build a working set of methods for fast execution.

Figure 4:
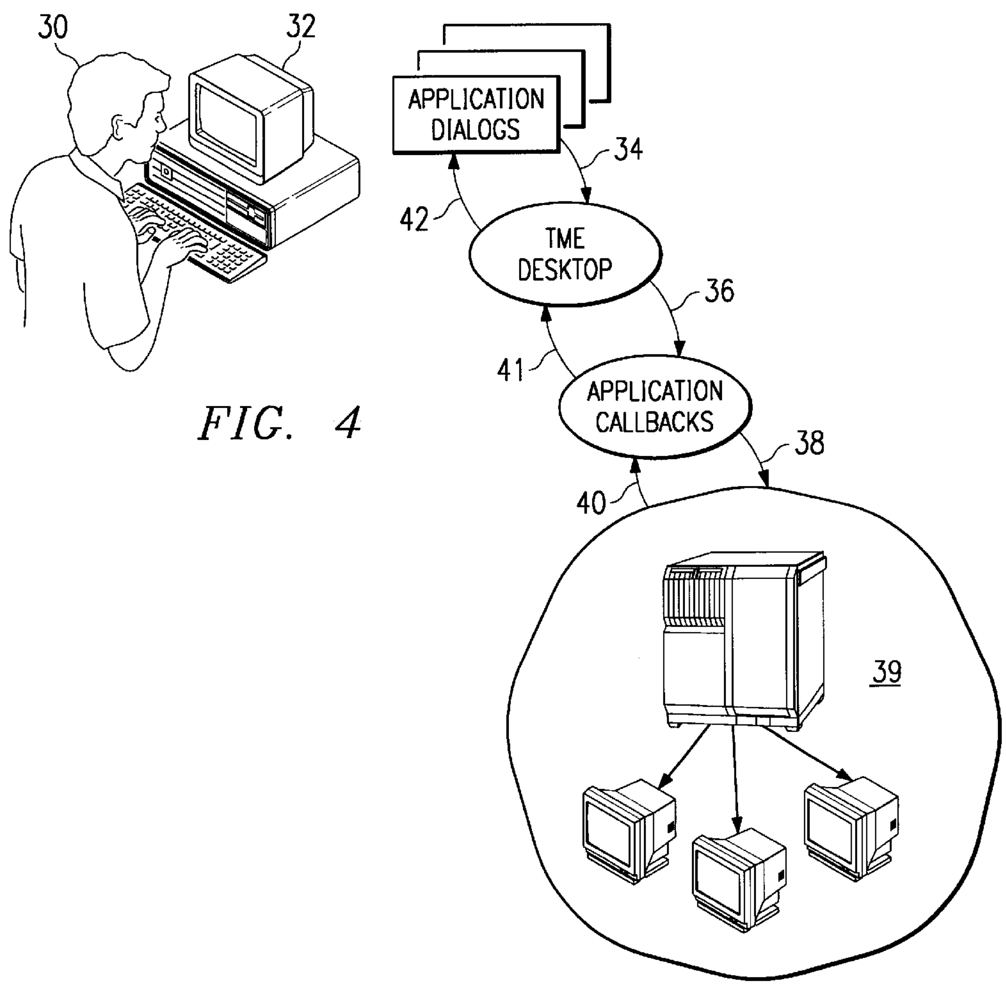
FIG. 4 shows a simplified representation of how a system administrator implements a system management task.

Before illustrating how the framework is used, the following background is provided. FIG. 4 first illustrates how a systems management task is implemented. Each authorized administrator 30 has access to a desktop computer 32 containing one or more icons representing system resources. As administrators interact with dialog screens and menus available from these icons, they are able to change system configurations and manage new resources in the distributed environment, all in a known manner. In particular, when administrator 30 interacts with the desktop, so-called "callbacks" (i.e. software that responds to the user's actions) are invoked from the user interface on underlying objects representing some system resource or component. These callbacks are translated into a series of method invocations that actually perform the work and return results or status to the administrator.

In particular, and with reference to the process flow diagram of FIG. 4, the information flow begins when the administrator 30 selects an icon or interacts with a dialog. The information is then sent to the desktop (which may be connected to a server or a gateway) at step 34, at which time the appropriate application callback method is invoked at step 36. The callback method then invokes core application methods at step 38, which communicate with the application object(s) to perform some system management operation, as illustrated at step 39. Any return information or state is passed back at steps 40 and 41. If an update to the user interface is required, the desktop 32 interprets the output and updates the dialogs on the administrator's desktop at step 42.

Preferably, the framework includes a task library that enables administrators to create "shell" scripts that can run an any managed node of the enterprise environment. A shell script integrated with a managed node is called a "task." When administrators want to create a task, they provide a machine and a path to an executable file. The executable can be a shell script, a specialized script, a compiled program or any other kind of valid executable. When a task is created, the executable is stored as an attribute in an object database associated with a gateway machine. When the task is needed, the executable file is retrieved from the attribute and is provided to one or more managed nodes. After a task is created, it is added to the task library and displayed as an icon.

Figure 5:
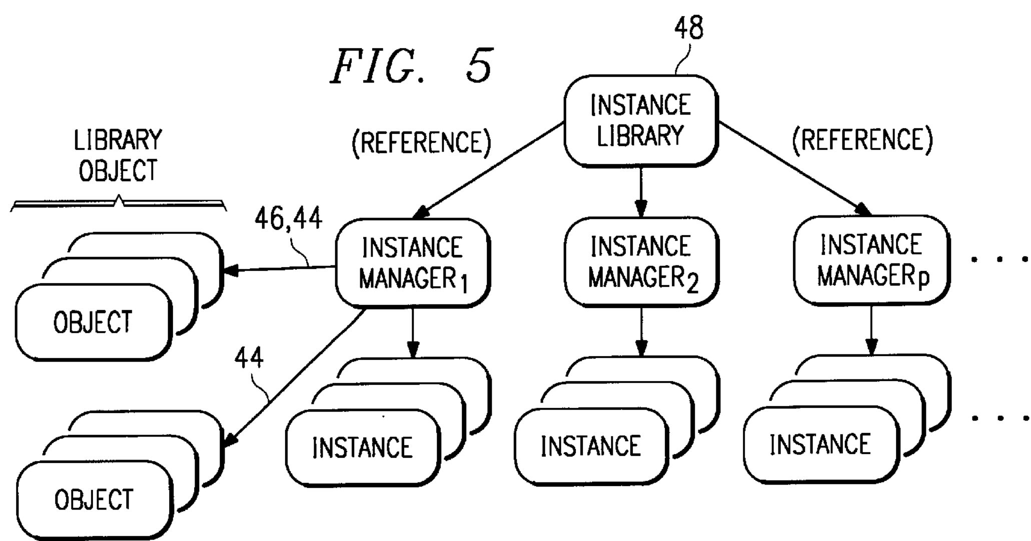
FIG. 5 illustrates how management applications are constructed in an object-oriented manner for use in the present invention.

FIG. 5 illustrates how systems management applications are constructed from a set of standard object types that together constitute a general applications architecture for the framework. These standard object types are closely interrelated and are used to build objects for system management applications. The objects provided by a management application can be divided into one or more object types 44 that are managed by one or more instance managers 46. An object type is a set of objects that share a common interface. Each object of the same type is called an instance of the type. Within the systems management framework, object types are associated with a particular instance manager. The instance managers are registered and stored in a library 48, which provides a central repository for system administration object information within a managed region.

As referenced above, the systems management provides an implementation of a CORBA 1.1 Object Request Broker (ORB), basic object adaptor (BOA), and related object services. CORBA 1.1 is a specification for an object-oriented distributed computer systems management architecture provided by The Object Management Group (OMG), a non-profit association of more than 300 companies. CORBA describes the use of the Object Request Broker (ORB) and basic object adaptor (BOA) that provide a mechanism for object invocation and return of results. The specification defines interfaces to a set of low-level object services and enables such services to be integrated in many different language and systems using object encapsulation, service requestor/provider isolation, and interface and implementation separation.

In a CORBA 1.1 implementation as seen in FIG. 6, there are three primary components: a client, an object implementation, and the ORB/BOA. The client 50 is the requester of a service that is provided by an object implementation 52. The ORB 21 delivers the request from the client 50 to the object implementation 52 through the BOA 27. The object implementation 52 then performs the requested service, and any return data is delivered back to the client. The client and object implementation are isolated from each other, and neither has any knowledge of the other except through their ORB/BOA interfaces. Client requests are independent of the object implementation location and the programming language in which they are implemented.

The ORB delivers the request to the BOA, which activates the process under which the object implementation (e.g., a server) runs. The BOA then invokes the method associated with the request by way of a server skeleton 61. When the method is finished, the BOA manages the termination of the method and coordinates the return of any results to the client. Alternatively, if a request is unknown until runtime, a Dynamic Invocation Interface (DII) 55 is used to build a request used in place of a client stub 63 linked at compile time.

With the above background, several examples of how system management tasks are carried out using the client-server framework are now described. The following discussion is merely exemplary, as the nature and type of systems management tasks that can be carried out by the framework is unconstrained. As noted above, the system management framework includes the server component supported on the gateway machines of the managed region, and the associated client component is supported on the endpoints serviced by the gateway(s). To provide transparent functionality, every method to be run on an endpoint is preferably configured on the gateway. All endpoint object references (Objrefs) that other methods use to invoke operations on an endpoint are Objrefs and each endpoint is assigned to a unique object dispatcher number (odnum). The gateway machine then uses true object references to "point" to the actual endpoint(s).

Figure 7:
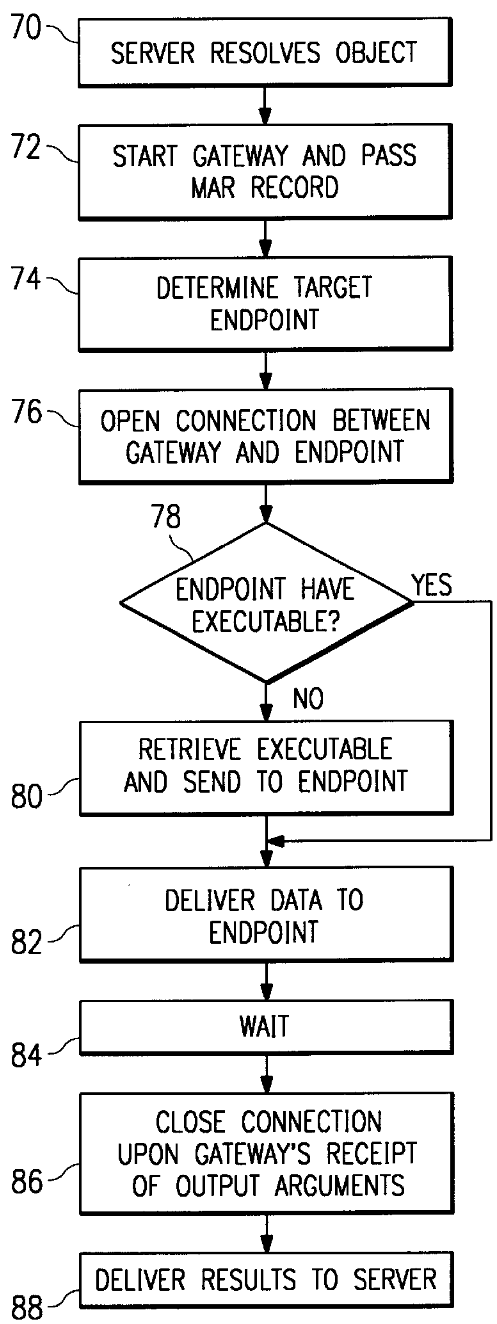
FIG. 7 is a flowchart illustrating how a gateway machine invokes a method of an object running on an endpoint machine to facilitate a management task.

The routine illustrated in FIG. 7 occurs when one method invokes a method of an object on an endpoint. At step 70, the server 14 resolves the Objref/method to a specific method daemon on a gateway. At step 72, the gateway is started (if it is not already running) and passed a method activation record or so-called MAR block. The MAR block contains all information necessary to invoke a method including the target Objref, the target method, "marshalled" input arguments and other fields from the server's method store. As noted above with respect to FIG. 6, when a request to run an operation on some object is made, a client stub initiates the request, collects the data associated with the request, and converts it from its current format to a common format. This process is known as "data marshalling" and is performed in accordance with the ASN.1 Standard. Up to this point, there is no difference as far as the application is concerned between this method invocation and any other method invocation. At step 74, the gateway looks at the Objref to determine the target endpoint. A connection to the endpoint is then opened at step 76.

The method continues at step 78 and queries whether the endpoint has a copy of the executable for the method. If not, the routine continues at step 80 to retrieve the appropriate executable from the object database (based on the endpoint's machine type), and the executable is then sent to the endpoint. At step 82, or if the endpoint already had the necessary executable, the gateway sends the still-marshalled input arguments to the endpoint. At step 84, the gateway enters into a wait state, waiting for the marshalled output arguments to be returned. When this occurs, the routine continues at step 86 and closes the connection to the endpoint. The output arguments are then sent back to the server at step 88 and the routine terminates as though the method had executed locally.

Endpoint-initiated operations can now be described. In these types of operations, the endpoint first attempts to establish a connection back to its gateway. Preferably, this is done in the same way that the endpoint client attempts to identify itself upon boot. It first tries its last known gateway host; if it gets no response, the endpoint then contacts the server's TN Manager routine either directly or, if that fails, via a BOOTP broadcast. Once connected, the server component of the gateway is invoked and the endpoint passes a descriptor telling the gateway which endpoint has connected.

Upcalls are method requests originating at the endpoint. The Tivoli Courier™ pull interface is an example of a program making upcalls. Not all applications will need upcalls. An endpoint makes an upcall by calling an IDL compiler generated stub. Unlike a normal method invocation, an upcall always invokes a special upcall method on the gateway. An application that supports upcalls must provide both the endpoint code and the special upcall method. The endpoint upcall facility is not a general purpose method invocation interface. This design maintains scalability by handling upcalls at the local gateway without management server intervention.

Figure 8A:
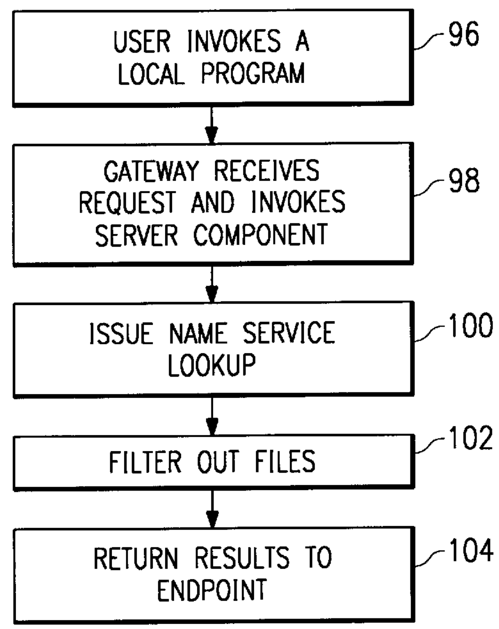
FIG. 8A is a flowchart illustrating how an endpoint machine initiates a file pull system management operation.

An illustrated "file pull" operation is shown in FIG. 8A. In this operation, the endpoint-resident code (i.e. the client component) initiates a file request, and the gateway-resident code (i.e. the server component) handles the request. The routine begins at step 96, with the user on the endpoint invoking a local program that is part of the client component of a file distribution application. This step invokes a method asking for a list of all available filepacks. A "filepack" is a collection of files being distributed in accordance with a system management task. At step 98, the gateway receives the request, invokes the server component of the file distribution application, passing it the descriptor identifying the endpoint. The software distribution program, running as a method on the gateway, issues a name service lookup at step 100, filters out filepacks that the endpoint is allowed to receive at step 102, and then returns the list to the endpoint at step 104. Depending on the actions of the user, the endpoint may then invoke another method asking for a specific filepack.

Figure 8B:
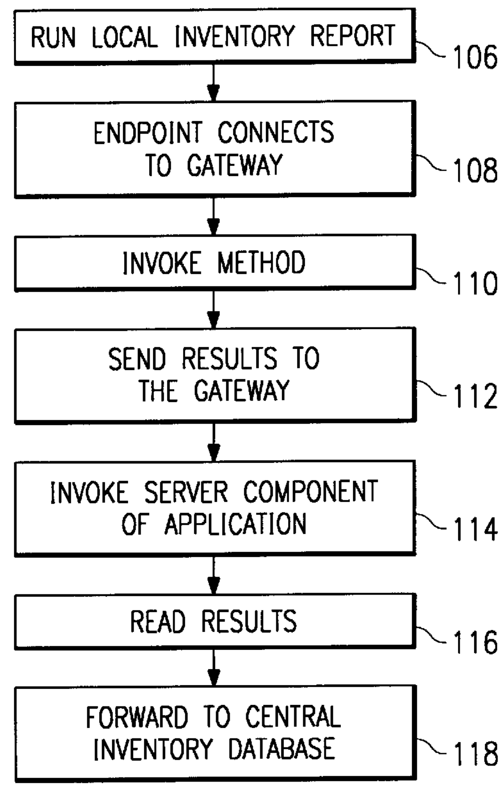
FIG. 8B is a flowchart illustrating how an endpoint machine initiates an inventory system management operation.

FIG. 8B illustrates an inventory reporting system management task. In this example, assume that an inventory application is designed to collect inventory information (e.g., the hardware and software configuration details) from a machine whenever the machine is rebooted. It is also assumed that an initialization method has been run on each endpoint to edit the appropriate boot-time script to run the inventory report program on boot. The routine starts upon the next boot. In particular, at step 106, the program runs the local inventory report to produce a data file of inventory results. At step 108, the endpoint connects to the gateway in the manner previously described. The endpoint then invokes an "inventory report" method at step 110 and, at step 112, sends the results to the gateway. At step 114, the server component of the inventory report method is invoked and passed a descriptor identifying the endpoint. The inventory results are read by the gateway at step 116 and, at step 118, forwarded to a central inventory database object.

The LCF is designed with efficient distributions operations in mind. Each gateway is also a repeater for each of the gateway's endpoints. This relationship is implicit so it does not need to be set in the repeater configuration. Distributions fan out from the gateway to the endpoints without further server support. Eliminating the server as a bottleneck makes distributions very scaleable.

As can be seen, the endpoint remains essentially dataless except as needed to carry out the particular system management task. This operation is facilitated by distributing the system management framework across client components, supported on the endpoints, and server components, supported on the gateways that service the endpoints.

As noted above, the LCF is extensible and thus new application functionality is easily added to the system management framework without having to rebuild or reinstall the client component at the endpoint. The specifics on how the LCF is installed and activated vary from OS type to OS type. On some operating systems there is a background task (e.g., inted on Unix) that listens for incoming network connections. On other operating systems, the lcf itself is configured as a background task that is dormant until a network request activates it. In all cases, a persistent network listener of the lcf is relatively small. The network listener will fork/spawn/invoke the larger application component (as the case may be) in response to a request from the client.

According to the invention, the code running on each endpoint is a small subset of a object-oriented CORBA runtime. This subset has sufficient functionality to implement methods such as the filepack distribution methods and CCMS profile endpoint methods (dataless model). The basic components are ADR encoding routines for argument marshaling, standalone IPC library, bdt (block data transfer) and iom, message catalogs for 118N, memory management and exception handling.

One of the preferred implementations of the client component of the system management framework is as a set of instructions in a code module resident in the random access memory of the endpoint. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via the Internet. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific network environment, those skilled in the art will recognize that the invention can be practiced, with modification, in other and different network architectures with the spirit and scope of the appended claims. The present invention, however, is not to be construed as limited to the particular managed architecture illustrated and thus in a more general sense the inventive use of a client-server managed framework should be broadly construed to be useful in any distributed network configuration.

Having thus described my invention, what I claim as new and desire to secure by Letters Patent is set forth in the following claims.

What is claimed is:

1. A method of managing computing resources in a large distributed enterprise, comprising the steps of:

organizing the computing resources into one or more managed regions, each region being managed by a server machine servicing one or more gateway machines, each gateway machine servicing a plurality of endpoint machines, wherein each of the endpoint machines runs a client component of a system management framework and wherein the gateway machine that services the endpoint machines runs a server component of the system management framework, and wherein the client component of the system management framework has an operating state that is normally idle; and delivering, on an as-needed basis, executable code and system management data from a gateway to one or more endpoint machines serviced by the gateway to facilitate execution of at least one system management task affecting the managed region in the one or more endpoint machines.

2. The method as described in claim 1 wherein data is used by the one or more endpoint machines to facilitate execution of the system management task and is not stored for subsequent use.

3. The method as described in claim 1 further including the step of caching the executable code for subsequent use.

4. The method as described in claim 1 further including the step of maintaining the computing resources by backing up system management data only from the server and the one or more gateway machines.

5. The method as described in claim 1 wherein at least some of the endpoint machines are personal computers.

6. The method as described in claim 1 wherein the server component of the system management framework executes in a multi-threaded fashion.

7. A method of managing computing resources in a large distributed enterprise, comprising the steps of:

organizing the computing resources into one or more managed regions, each region being managed by a server machine servicing one or more gateway machines, each gateway machine servicing a plurality of endpoint machines; and supporting a client component of a system management framework on each of the endpoint machines, wherein a gateway machine that services endpoint machines runs a server component of the system management framework, and wherein the client component of the system management framework has an operating state that is normally idle; and delivering, on an as-needed basis, executable code and system management data from a gateway to one or more endpoint machines serviced by the gateway to facilitate execution of system management tasks affecting the managed region using the system management framework.

8. The method as described in claim 7 wherein the data is used by the one or more endpoint machines to facilitate execution of the system management tasks and is not stored for subsequent use.

9. The method as described in claim 8 further including the step of maintaining the computing resources by backing up system management data from the server and the one or more gateway machines.

10. The method as described in claim 7 wherein at least some of the endpoint machines are personal computers.

11. The method as described in claim 7 wherein the server component of the system management framework is a multi-threaded process.

12. The method as described in claim 7 further including the step of adding new application functionality to the client component of the system management framework.

13. In a large distributed enterprise wherein computing resources are organized into one or more managed regions, each region being managed by a server machine servicing one or more gateway machines, each gateway machine servicing a plurality of endpoint machines, a method of executing a system management task affecting a managed region, comprising the steps of:

delivering executable code and system management data required for the system management task from a gateway machine to one or more endpoint machines serviced by the gateway, wherein each of the endpoint machines runs a client component of a system management framework, wherein the gateway machine that services the endpoint machines runs a server component of the system management framework, and wherein the client component of the system management framework has an operating state that is normally idle; and using a distributed system management framework supported on the gateway machine and the one or more endpoint machines to carry out the system management task using the executable code and system management data.

14. A computer connectable into a large distributed enterprise having a server machine servicing a set of gateway machines, each of which services a set of endpoint machines, comprising:

a processor;

an operating system; and a client component of a system management framework, the client component having an associated server component supported on a gateway machine, wherein the client component of the system management framework has an operating state that is normally idle, wherein the client component of the system management framework includes:

means for receiving executables and system management data from the gateway machine; and means for facilitating execution of a system management task affecting the managed region into which the computer is connected.

15. The computer as described in claim 14 wherein the means includes a daemon and an application runtime library.

16. The computer as described in claim 15 wherein the daemon is responsible for endpoint login to a gateway machine and for spawning an executable downloaded from the gateway machine.

17. A computer connectable into a large distributed enterprise having a server machine servicing a set of gateway machines, each of which services a set of endpoint machines, comprising:

a processor;

a multi-threaded operating system; and a server component of a system management framework, the server component having an associated client component supported on one or more endpoint machines, wherein the client component of the system management framework has an operating state that is normally idle, wherein the server component of the system management framework includes means responsive to a method invocation for providing executables and system management data to one or more endpoint machines to facilitate execution of a system management task affecting the managed region into which the computer is connected.

18. A computer system, comprising:

a set of endpoint machines, each of which includes a processor, an operating system, and a client component of a system management framework, the client component being dataless and having an associated server component, and wherein the client component of the system management framework has an operating state that is normally idle;

at least one gateway machine including a processor, a multi-threaded operating system and the associated server component of the system management framework;

wherein the client component of the system management framework includes means for receiving executables and system management data from the server component of the system management framework to facilitate execution of a system management task.

* * * * *